Patented Nov. 7, 1944

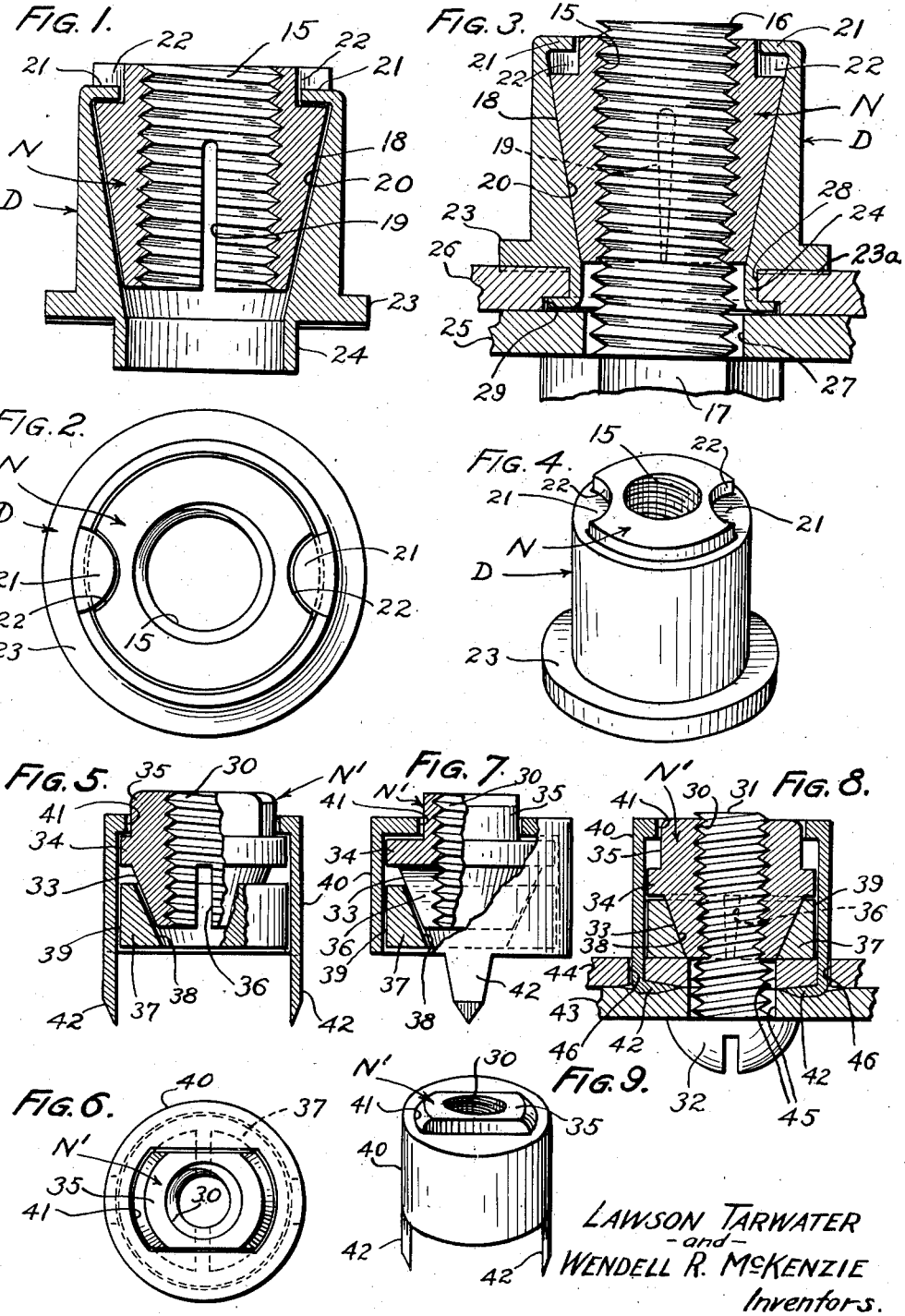

2,361,979

UNITED STATES PATENT OFFICE 2,361,979

NUT LOCK CONSTRUCTION

Lawson Tarwater and Wendell R. McKenzie, Los Angeles, Calif., assignors, by mesne assignments, to Bank of America National Trust and Savings Association, Los Angeles, Calif., a national banking association Application June 2, 1942, Serial No. 445,440

5 Claims. (Cl. 151—19)

Our invention relates to nut lock construction, and it has for a purpose the provision of a nut lock construction which is particularly adapted for use in connection with screw-bolts for securing plates or sheets of metal or other material to each other, as in airplane fuselage and wing construction, our invention being characterized by a constrictable lock nut, having a screw-bolt employed to secure the sheets or plates one to the other, a member for holding the lock nut against rotation on the screw-bolt as the latter is screwed thereinto, and a constricting element for the lock nut, formed integral with or separately from the holding member and operating, when the screw-bolt is screwed into the lock nut, to constrict the latter into locking engagement with the screw-bolt, and with such security as to prevent loosening of the nut or the screw-bolt under the most severe vibrations.

It is also a purpose of our invention to provide a nut lock combination of the above described character, wherein, the lock nut has a conical portion split to allow constriction thereof, and the constricting element a conical portion engageable by the conical portion of the nut to cause constriction of the latter, and the holding member provided with means for securing it to the pieces of metal or other work which the screw-bolt is employed to fasten together, whereby when the screw-bolt is screwed into the lock nut with the latter held against rotation, the lock nut will be drawn into the constricting element to cause the conical portions to constrict the lock nut into locking engagement with the screw-bolt.

We will describe only two forms of our nut lock construction and will then point out the novel features thereof in claims.

In the accompanying drawing:

Fig. 1 is a view showing in vertical section, one form of nut lock construction embodying our invention.

Fig. 2 is a top plan view of the lock nut construction shown in Fig. 1.

Fig. 3 is a view similar to Fig. 1 with a nut lock construction in locked position on a screw-bolt, and in association with two sheets of material which the screw-bolt is employed to secure together.

Fig. 4 is a detail perspective view of the nut lock construction as shown in Fig. 1.

Fig. 5 is a vertical sectional view, partly in elevation, showing another form of nut lock construction embodying our invention.

Fig. 6 is a top plan view of the nut lock construction shown in Fig. 5.

Fig. 7 is a view similar to Fig. 5, but taken at right angles thereto.

Fig. 8 is an enlarged vertical sectional view of the nut lock construction shown in Fig. 5, as applied to a screw-bolt and the two sheets of material which the screw-bolt is employed to secure together.

Fig. 9 is a perspective view of the nut lock construction shown in Figs. 5 to 8.

Similar reference characters refer to similar parts in each of the several views.

Referring first to the form of our invention shown in Figs. 1 to 4, the nut lock construction comprises a lock nut N which may be of elongated form and provided with a threaded bore 15 for receiving the threaded shank 16 of a screw-bolt having a hexagonal head 17. The outer periphery of the lock nut N is of conical form to provide a frustrated cone 18, and for a major portion of its length the nut is split at diametrically opposed points, as at 19 to permit constriction thereof, and thereby cause its thread to have locking engagement with the thread of the shank 16.

For constricting the nut N to effect such locking, a combined nut holding and constricting device D, is provided. This device comprises a body of sleeve form tapered in thickness to provide on its inner periphery a frustrated conical bore 20. This bore is of such diameter as to allow movement of the lock nut axially therein and so that when moved axially inward, the external cone of the nut will engage the internal cone of the device and thereby cause the nut to be constricted.

The nut holding function of the device D is attained through the provision on the outer or upper end thereof, of a pair of diametrically opposed tongues 21 extending inwardly to be disposed in diametrically opposed recesses 22 formed in the outer end of the lock nut. These recesses and tongues coact to prevent rotation of the nut and device relatively and yet allow movement of the nut axially within the device. As illustrated these recesses and projections are of substantially semicircular form to effectively resist rotation of the nut and the device relatively, and without the possibility of the projections being broken from the device.

At the wide or inner end of the device D an annular flange 23 is formed on its outer wall, while on its inner wall and constituting a continuation thereof but not of the cone, is a collar 24. This collar is bendable to the form shown in Fig. 3 for securing the device to the work through which the screw-bolt is adapted to extend, and so that the device cannot rotate on the work. The flange 23 increases the surface area of the inner end face of the nut and may be serrated as at 23a to aid in preventing turning of the nut on the work.

The work just referred to may be two pieces or sheets 25 and 26 of metal or other material, superimposed or overlapping each other at the marginal edges thereof such as in the wing and fuselage construction of airplanes. The sheet 25 is formed with an opening 27 and the sheet 26 with an opening 28. Both of these openings are sufficiently large to freely receive the bolt shank 16, and the opening 28 is sufficiently large to accommodate the collar 24. Bounding the opening 28 is a recess 29 on the inner face of the sheet 26. This is for the purpose of receiving the marginal edge of the collar 24 when the latter is bent outwardly, as shown in Fig. 3.

In practise, the nut N and the device D are first assembled by inserting the nut into the large end of the device, and then bending the tongues 21 inwardly into the recess 22. Thus, the bottom walls of the recesses coact with the tongues to retain the nut within the device, so that a unitary structure is provided which facilitates handling and application of the nut lock construction to the work and the screw-bolt.

To apply the nut to the two sheets 25 and 26, the device D is arranged at the outer face of the sheet 26 so that the collar 24 extends into the opening 28, whereupon the two sheets are pressed together by the nut causing the inner face of the sheet 26 to engage and bend the collar outwardly into the recess 29. This draws the flange 23 tightly against the sheet 26 causing the serrations to embed themselves in the sheet. Thus the device is fastened to the sheet 26 and secured against rotation thereof to hold the lock nut against rotation and its bore in registration with the openings.

The screw-bolt is now applied by extending its shank through the sheet openings, and then turning it into the lock nut until the head 17 abuts the sheet 25. During this operation rotation of the bolt draws the lock nut inwardly of the device causing the conical surfaces 18 and 20 to coact in constricting the lock nut sufficiently to grip and lock the lock nut against loosening on the bolt. Manifestly, any tendency of the lock nut to expand and loosen is resisted by the device as well as the axial stress of the bolt.

Referring now to Figs. 5 to 9, we have shown another form of nut lock construction embodying the same method of locking as in the first form. Here the lock nut N¹ has a threaded bore 30 for engagement with the threaded shank 31 of a screw-bolt, the head 32 having the form of a screw head. The lock nut has an inner portion 33 of frustrated conical form, an intermediate annular rib 34, and an outer portion 35 of non-circular configuration. The portion 33 is split at opposed points as indicated at 36 to allow constriction of such portion.

A member for constricting the conical split portion of the lock nut comprises a ring 37 the inner periphery of which is shaped to form a frustrated cone 38. The outer periphery 39 of the ring may be annular and of a diameter substantially the same as the rib 34.

An element for holding the lock nut N¹ against rotation during and subsequent to application of the screw-bolt thereto, comprises a cup shaped metal body 40 in which the lock nut and the locking or constricting ring, are received sufficiently loose to allow axial movement of the two in the body.

The outer or closed end of the element body 40 is formed with a non-circular opening 41 corresponding in shape to the outer nut portion 35 so as to receive the latter in a manner to prevent rotation of the nut in the body, while permitting movement of the nut axially therein. At the inner or open end of the body 40, a pair of bendable prongs or tongues 42 are formed at diametrically opposite points thereon. The free ends of these prongs may be beveled and pointed as shown.

As in the first form of our invention, the screw-bolt and nut lock construction are employed to secure together two pieces of work, such for example as the metal plates or sheets 43 and 44 shown in Fig. 8. These sheets are formed with registering openings 45 to receive the bolt shank 31, while at points spaced from the openings and diametrically opposed are slots 46, 46 for receiving the prongs 42.

In practise, the lock nut N¹ and the constricting ring 37 are inserted into the holding element 40 in the order named, and so that the conical and split portion 33 is extended into the conical portion 38 of the ring. Following this assembly operation, the holding element is applied to the sheet 44 by extending the prongs 42 through the slots 46, and bringing the two sheets and the nut together and pressing them to bend the prongs to the angular positions shown in Fig. 8. Thus, the nut lock construction is mounted on the work for reception and locking of the screw-bolt.

The screw-bolt is applied by extending the shank 31 through the openings 45, and screwing it home in the lock nut. As a result the lock nut, being held against rotation by the element 40, is drawn axially inwardly of the locking ring 37, thereby causing the cone surfaces 33 and 38 to coact in constricting the lock nut, at the split portion, into locking engagement with the shank 31.

Although we have herein shown and described only two forms of nut lock constructions, each embodying our invention, it is to be understood that various changes and modifications may be made therein without departing from the spirit of our invention and the spirit and scope of the appended claims.

We claim:

1. In a nut lock construction; a lock nut having a thread for engaging the thread of screw-bolt extended through two sheets of metal, the outer end of said nut having a non-circular portion and the inner end having a cone portion; a locking ring having an inner periphery of cone form receiving the cone portion of said nut, said nut being split along its cone portion to allow constriction thereof; and a member having means for fixedly securing the same to one of said sheets to receive the shank of the screw-bolt, said member receiving said nut and said ring and having a non-circular opening receiving the non-circular portion of said nut to hold the latter against rotation relative to said member and yet permit movement of said nut axially of said member.

2. In a nut lock construction; a lock nut having a thread for engaging the thread of screw-bolt extended through two sheets of metal, the outer end of said nut having a non-circular portion and the inner end having a cone portion; a locking ring having an inner periphery of cone form receiving the cone portion of said nut, said nut being split along its cone portion to allow constriction thereof; and a member of cup form having at its open end bendable tongues extendable between said sheets for fixedly securing the member to one of the sheets to receive the shank of the screw-bolt, said member receiving said nut and said ring and at its other end engaging the non-circular portion of said nut to hold the latter against rotation relative to said member and yet permit movement of said nut axially of said member.

3. In a nut lock construction as embodied in claim 1, wherein the lock nut has a shoulder between said portions thereof for limiting movement of the nut lock inwardly of said ring.

4. In combination; two pieces of metal arranged in over-lapped relation to provide an overlapped joint, said pieces having registering openings at said joint and slots in one of said pieces; a screw-bolt extending through said openings; and a nut lock construction comprising a lock nut on the shank of the screw-bolt at the outer side of that one of said pieces from which the unheaded end of the screw bolt extends, said lock nut having a thread engaging the thread of the screw-bolt, the outer end of said nut having a non-circular portion and the inner end having a cone portion split to allow constriction thereof; a locking ring having an inner periphery of cone form receiving the cone portion of said nut, and a member of cup form having tongues at its open end extendable between said pieces for fixedly securing the member to one of the pieces so that said member can receive the shank of the screw-bolt, said member receiving said nut and said ring and at its outer end engaging the non-circular portion of said nut to hold the latter against rotation and yet permit movement thereof axially in said member.

5. In combination; two pieces of metal arranged in over-lapped relation to provide an over-lapped joint, said pieces having registering openings at said joint, and one of the openings larger than the other, and with a recess bounding said opening at the inner side of the respective piece; a screw-bolt extending through said openings; and a nut lock construction comprising a lock nut on the shank of the screw-bolt at the outer side of that one of said pieces from which the unheaded end of the screw-bolt extends, said lock nut having a thread engaging the thread of the screw-bolt, having an outer periphery of cone form, and split to permit constriction thereof, the outer end of said nut having recesses therein; a conical sleeve receiving said nut, projections on said sleeve engaging said nut within said recesses, and a collar on said sleeve extending through the larger opening and into the recess bounding said opening, whereby said sleeve is secured to the respective piece against rotation so that when said screw-bolt is screwed into said nut the latter will be moved axially inward of the sleeve to cause the latter to constrict said nut into locking engagement with said screw-bolt.

WENDELL R. McKENZIE.
LAWSON TARWATER.